United States Patent
Cho et al.

(10) Patent No.: US 11,590,469 B2
(45) Date of Patent: Feb. 28, 2023

(54) COMPOSITION AND PROCESS FOR PELLETIZING CARBON-BASED MATERIALS FOR PROPPANT AND INDUSTRIAL APPLICATIONS

(71) Applicant: CARBO Ceramics Inc., Houston, TX (US)

(72) Inventors: Minjung Cho, Katy, TX (US); Todd Roper, Katy, TX (US); Thu Lieng, Richmond, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 17/526,746

(22) Filed: Nov. 15, 2021

(65) Prior Publication Data

US 2022/0126246 A1    Apr. 28, 2022

Related U.S. Application Data

(62) Division of application No. 16/833,240, filed on Mar. 27, 2020, now Pat. No. 11,173,462.

(Continued)

(51) Int. Cl.
| | |
|---|---|
| *C09K 8/80* | (2006.01) |
| *B01J 2/06* | (2006.01) |
| *B01J 6/00* | (2006.01) |
| *C10B 57/00* | (2006.01) |
| *C01B 33/40* | (2006.01) |

(52) U.S. Cl.
CPC ............... *B01J 2/06* (2013.01); *B01J 6/001* (2013.01); *C01B 33/40* (2013.01); *C09K 8/805* (2013.01); *C10B 57/005* (2013.01); *C01P 2006/40* (2013.01)

(58) Field of Classification Search
CPC .................. C09K 8/805; C01P 2006/40
USPC ....... 428/403, 404, 405; 427/212; 166/250.1; 507/100, 143, 140
See application file for complete search history.

(56) References Cited

U.S. PATENT DOCUMENTS

| | | | |
|---|---|---|---|
| 6,632,528 B1 * | 10/2003 | Clough | ................ C23C 30/00 428/404 |
| 7,459,209 B2 * | 12/2008 | Smith | .................. C04B 35/14 428/404 |

(Continued)

FOREIGN PATENT DOCUMENTS

WO    2004058480 A1    7/2004

OTHER PUBLICATIONS

2004058480 WO, International Search Report and Written Opinion dated Jun. 23, 2020 for Application No. PCT/US2020/025442.

(Continued)

*Primary Examiner* — Prem C Singh
*Assistant Examiner* — Brandi M Doyle
(74) *Attorney, Agent, or Firm* — Patterson + Sheridan, LLP

(57) ABSTRACT

A method for producing an electrically-conductive pellet includes reducing a size of a first material. The method also includes wetting the first material to produce a first slurry. The method also includes introducing the first slurry into a fluidizer to produce a first pellet. The method also includes reducing a size of a second material. The second material is an electrically-conductive material. The method also includes wetting the second material to produce a second slurry. The method also includes applying the second slurry to the first pellet.

13 Claims, 6 Drawing Sheets

Related U.S. Application Data

(60) Provisional application No. 62/825,654, filed on Mar. 28, 2019.

(56) References Cited

U.S. PATENT DOCUMENTS

| | | | |
|---|---|---|---|
| 8,168,570 B2 * | 5/2012 | Barron | C04B 35/62839 |
| | | | 428/404 |
| 8,865,631 B2 * | 10/2014 | Eldred | C04B 38/009 |
| | | | 507/211 |
| 8,883,693 B2 * | 11/2014 | Eldred | C09K 8/80 |
| | | | 507/211 |
| 8,931,553 B2 * | 1/2015 | Cannan | E21B 47/092 |
| | | | 166/250.01 |
| 9,670,400 B2 * | 6/2017 | Eldred | C09K 8/70 |
| 10,077,395 B2 | 9/2018 | Eldred et al. | |
| 10,106,732 B2 | 10/2018 | Cannan et al. | |
| 10,262,773 B2 | 4/2019 | Sirola et al. | |
| 10,301,536 B2 | 5/2019 | Cannan et al. | |
| 10,422,209 B2 | 9/2019 | Batarseh | |
| 2005/0274510 A1 | 12/2005 | Nguyen et al. | |
| 2008/0135245 A1 | 6/2008 | Smith et al. | |
| 2012/0227968 A1 | 9/2012 | Eldred et al. | |
| 2012/0279703 A1 | 11/2012 | McDaniel et al. | |
| 2012/0313056 A1 | 12/2012 | Baran et al. | |
| 2014/0096953 A1 | 4/2014 | Hocking | |
| 2014/0190686 A1 | 7/2014 | Cannan et al. | |
| 2014/0329005 A1 | 11/2014 | Neltner et al. | |
| 2016/0222283 A1 * | 8/2016 | Cannan | C23C 18/1639 |
| 2016/0230083 A1 * | 8/2016 | Mohanty | C09K 8/80 |
| 2016/0376199 A1 * | 12/2016 | Koep | C09K 8/80 |
| | | | 507/271 |
| 2017/0092388 A1 | 3/2017 | Lee et al. | |
| 2017/0226411 A1 * | 8/2017 | Cannan | G01V 3/26 |
| 2018/0100389 A1 | 4/2018 | Sen et al. | |
| 2019/0225877 A1 * | 7/2019 | Roper | C09K 8/805 |
| 2019/0309220 A1 * | 10/2019 | Cannan | C23C 18/405 |
| 2019/0330520 A1 * | 10/2019 | Cannan | E21B 43/26 |
| 2020/0231866 A1 * | 7/2020 | Sodhi | C09K 8/572 |
| 2022/0126246 A1 * | 4/2022 | Cho | B01J 2/06 |

OTHER PUBLICATIONS

International Search Report and Written Opinion dated Jun. 23, 2020 for Application No. PCT/US2020/025442.

* cited by examiner

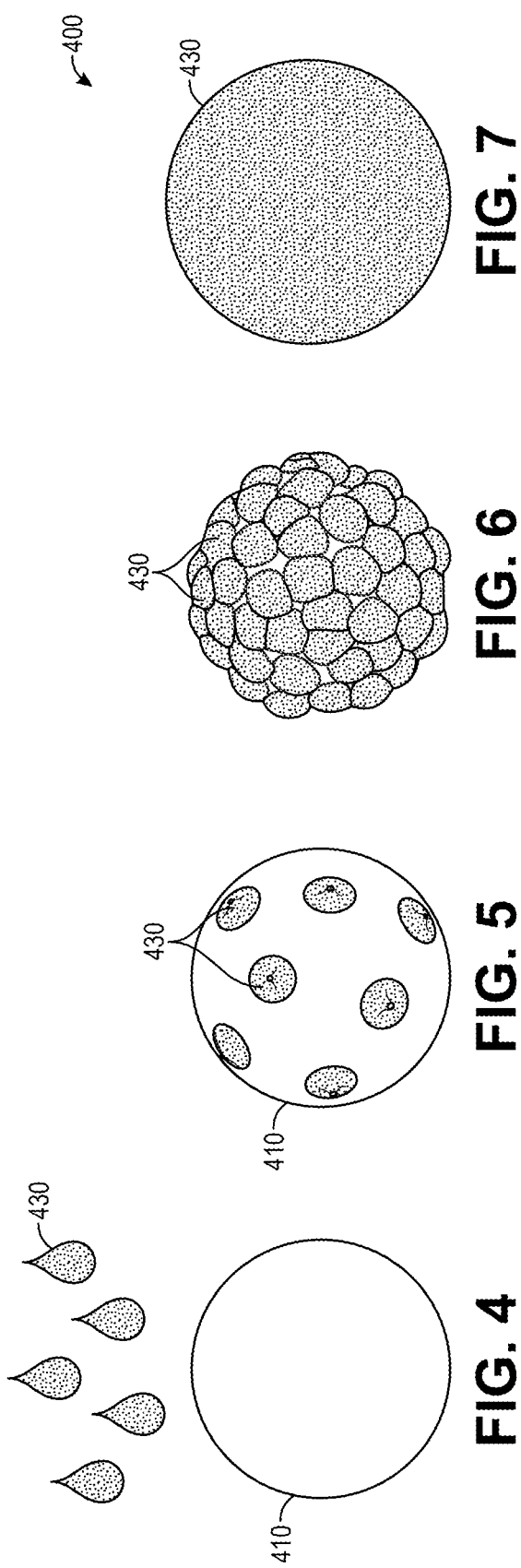

COMPOSITION AND PROCESS FOR PELLETIZING CARBON-BASED MATERIALS FOR PROPPANT AND INDUSTRIAL APPLICATIONS

CROSS-REFERENCE TO RELATED APPLICATIONS

This application is a divisional application of U.S. patent application Ser. No. 16/833,240 filed on Mar. 27, 2020, which claims priority to, and the benefit of the filing date of, U.S. Patent Application No. 62/825,654, filed Mar. 28, 2019, the entire disclosures of which are herein incorporated by reference.

BACKGROUND

Electrically-conductive, carbon-based materials are used in several industrial applications. One application is as backfill around grounding electrodes used for lightning strike mitigation. The carbon-based material increases the grounding capacity of the electrode by increasing the dissipation to ground, thereby ensuring sufficient grounding. Another application is cathodic protection of important structures, where the electrically-conductive carbon-based material is packed around the sacrificial anode, resulting in improved performance and lifetime of the anode. In both industrial applications, the carbon-based materials include coal-based and petroleum-based derivatives, such as petroleum coke (i.e., coke breeze) and calcined petroleum coke.

Petroleum coke is a carbon-rich material derived from oil refining, specifically the coking process, which converts residual oils into lighter oil and generates petroleum coke as a by-product. Petroleum coke is more than 90% carbon and is available in a variety of types (e.g., needle coke, honeycomb coke, sponge coke, fuel-grade coke, green coke, and calcined coke). Calcined coke is heat-treated to remove impurities, thereby increasing the carbon content to 97-100%. Calcining increases the electrical conductivity (e.g., 1,000 S/m @ 150 psi) and also increases the hardness and density of the particles.

Several disadvantages of the current materials, from a proppant application standpoint, can include one or more of the following: irregular shape, low density, weak-moderate strength, broad size distributions, and bulk scale availability. For example, calcined coke 4518 has a bulk density of 60 lbs/cu ft (0.96 g/cc), 1.81 ASG, 5/45 sieve distribution, and 9% crush @ 6 k. Calcined Coke 251P has a bulk density of 70 lbs/cu ft (1.12 g/cc), 1.85 ASG, 40/200 sieve distribution, and 5% crush @ 6 k. Sponge Coke 158 has a bulk density of 60 lbs/cu ft (0.67 g/cc), 1.61 ASG, 20/50 sieve distribution, and 43% crush @ 6 k.

The idea to use coke as a proppant was first captured by Esso production research company in 1972 (see U.S. Pat. No. 3,664,420). They describe "fluid coke" as a material with 10-200 mesh size and 0.9-1.3 specific gravity. The patent does not mention electrical conductivity. In 1997, Texaco disclosed a resin-coated proppant system for flowback control, and coke was listed as a proppant option.

In recent years, technological advances in hydraulic fracturing have allowed engineers to map the complex fractures created within the earth formation with the use of electromagnetic proppant imaging. The proppant used to prop the fractures open is made to be electrically-conductive and is stimulated within the fractures by an applied electromagnetic energy. The stimulated proppant is then monitored/ measured by the surface receivers, the data is processed, and an image is generated. CARBO Ceramics has pioneered the development of metal alloy-plated ceramic/sand/glass beads to achieve the required electrical conductivity for successful imaging of the proppant, while retaining typical proppant properties (e.g., strength, shape, density, fluid conductivity). In 2013, UT Austin published a paper in the Geophysics journal describing the use of coke breeze as an electrically-conductive proppant for use in electromagnetic measurement of proppant location. Later, UT Austin/Statoil/UNC disclosed the use of proppant "additives" as a contrast agent to image proppant in a fracture (see WO2016201427A1). They disclose the use of coke breeze and zero valent iron particles at a loading of <30% in frac sand. A low cost alternative to conductive proppant (iON proppant from Carbo Ceramics) is a carbon-based material such as coke breeze. Furthermore, 2-component or 3-component blends with low-cost sand offer other low-cost alternatives (iON+ sand, coke+sand, iON+coke+sand). Oftentimes, these carbon-based materials are taken directly out of the mines and are used as-is in the field.

BRIEF SUMMARY

A method for producing an electrically-conductive pellet includes reducing a size of a first material. The method also includes wetting the first material to produce a first slurry. The method also includes introducing the first slurry into a fluidizer to produce a first pellet. The method also includes reducing a size of a second material. The second material is an electrically-conductive material. The method also includes wetting the second material to produce a second slurry. The method also includes applying the second slurry to the first pellet.

An electrically-conductive pellet (e.g., produced by the method) is also disclosed. The pellet includes a core made from a first material including alumina, silica, kaolin, bauxite, or a combination thereof. The pellet also includes a shell layer that at least partially surrounds the core. The shell layer is made from a second material that is electrically-conductive. The pellet has: an average cross-sectional length from about 200 µm to about 4000 µm, a bulk density from about 0.3 g/cm$^3$ to about 2.0 g/cm$^3$, and an electrical conductivity from about 100 S/m to about 3000 S/m.

In another embodiment, the method includes reducing a size of a material. The method also includes wetting the material with water and alginate to produce a slurry. The method also includes causing the slurry to flow through a nozzle, thereby producing a droplet of the slurry that falls into a vessel containing a solution. The droplet of the slurry solidifies into a pellet in response to contact with the solution.

In yet another embodiment, the method includes reducing a size of a material. The method also includes mixing the material with water and a binder material in a mixer to produce a plurality of pellets. The method also includes separating the pellets into a first portion and a second portion. The method also includes drying and/or calcining the first portion of the pellets.

BRIEF DESCRIPTION OF THE DRAWINGS

The present invention may best be understood by referring to the following description and accompanying drawings that are used to illustrate embodiments of the invention. In the drawings:

FIG. 4 illustrates a schematic view of a shell slurry being sprayed onto a core pellet, according to an embodiment.

FIG. 5 illustrates a schematic view of the shell slurry wetting the outer surface of the core pellet, according to an embodiment.

FIG. 6 illustrates a schematic view of the shell slurry solidifying on the core pellet, according to an embodiment.

FIG. 7 illustrates a schematic view of the solidified shell slurry (now referred to as a shell layer) on the core pellet, thereby forming an electrically-conductive pellet, according to an embodiment.

FIG. 8 illustrates a cross-sectional view of the electrically-conductive pellet (e.g., produced using the method in FIG. 3), according to an embodiment.

DETAILED DESCRIPTION

The present disclosure is directed to a pellet and a method for making the pellet. The pellet may be or include a carbon-based material with improved properties such as shape, performance (e.g., electrical conductivity, low resistivity), strength (e.g., crush resistance), density, sieve distribution, packing efficiency, fluid conductivity, or a combination thereof. More particularly, the pellet may include carbon-based raw materials such as petroleum coke (e.g., coke breeze), calcined petroleum coke, graphite, carbon black, and/or carbon fiber as a mineral ore component. In at least one embodiment, the pellet may include greater than about 95% (e.g., about 100%) carbon-based material as the mineral ore. In another embodiment, the pellet may include a blend of kaolin and/or bauxite-based mineral ore and carbon-based material. In another embodiment, the pellet may include a core-shell approach, where the core is a kaolin and/or bauxite-based mineral ore, and the shell is the carbon-based material.

The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The term "uncalcined" and related forms, as used herein, refers to a raw material that contains a residual amount of naturally-occurring volatiles, for example, from about 10 to about 40 wt. %, which may include organic material and chemically bound water (also referred to as "water of hydration").

The term "calcined" and related forms, as used herein, refers to a raw material that has been treated at temperatures and times sufficient to remove organic material and to substantially remove water of hydration.

Figure 1:
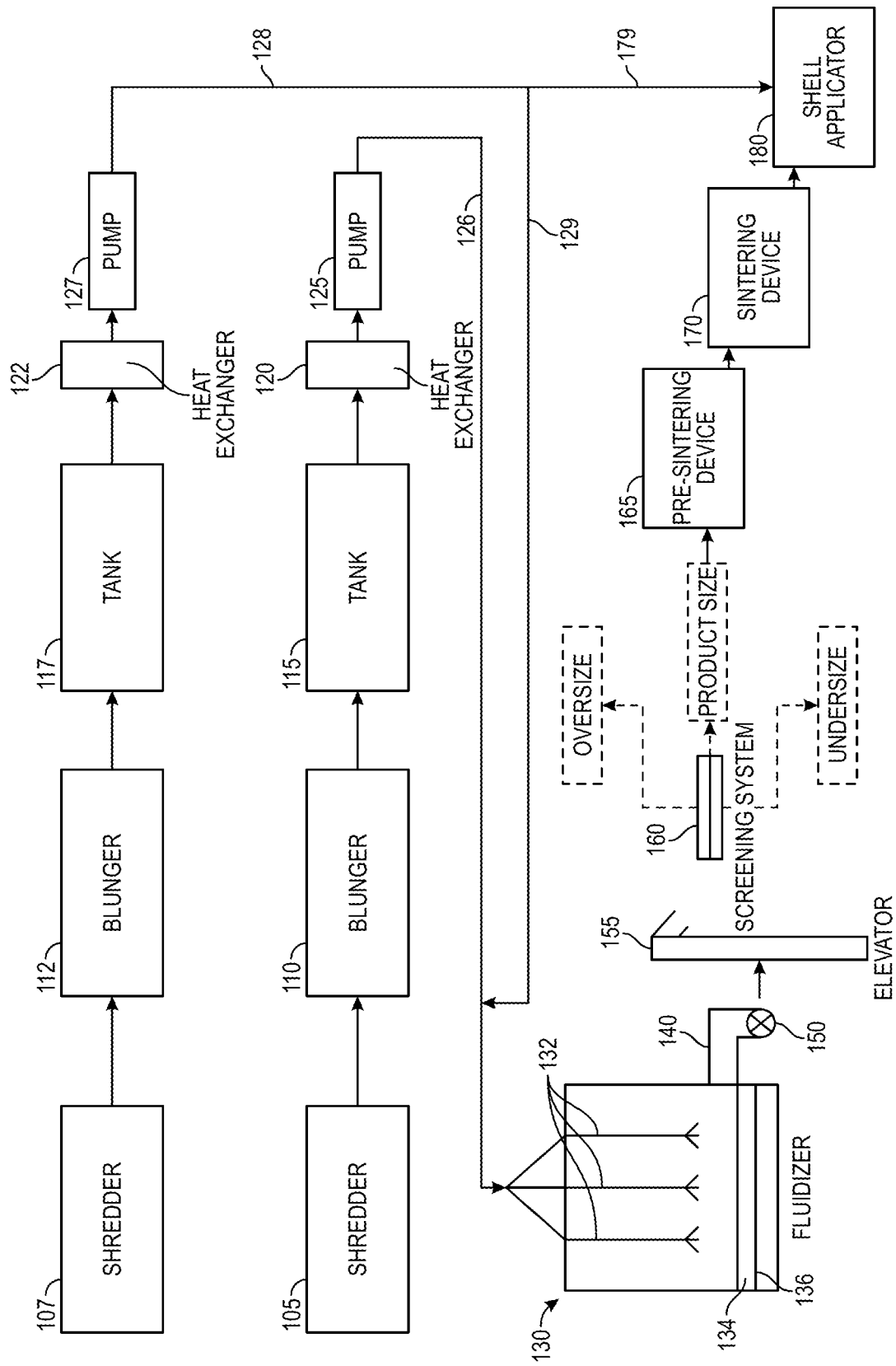
FIG. 1 illustrates a schematic view of a system for producing an electrically-conductive pellet, according to an embodiment.

FIG. 1 illustrates a schematic view of a system 100 for producing an electrically-conductive pellet, according to an embodiment. The system 100 may include a shredder 105 that slices and/or breaks apart a material into small chunks. The system 100 may also include a blunger 110 (e.g., including a rotating blade) that further reduces the particle size of the material. The blunger 110 may also mix the material with water, one or more dispersants, a pH-adjusting reagent, or a combination thereof to form a slurry. The system 100 may also include a tank 115 that receives the slurry from the blunger 110 and mixes the slurry. In at least one embodiment, a binder may be added to the slurry in the tank 115. The system may also include a heat exchanger 120 that heats the slurry to a temperature from about 25° C. to about 90° C.

The system 100 may also include a pump 125 that transfers the slurry, under pressure, from the heat exchanger 120 to a fluidizer 130 via a conduit (shown as line 126). In at least one embodiment, a grinding mill and/or a screen (not shown) may be inserted at one or more locations in the system 100, prior to feeding the slurry to the fluidizer 130, to assist in breaking any larger-sized material down to a target size suitable for feeding to the fluidizer 130.

The system 100 may also include a second shredder 107, a second blunger 112, a second tank 117, a second heat exchanger 122, and a second pump 127 and each of these may operate in the manner described above for the shredder 105, blunger 110, tank 115, heat exchanger 120, and pump 125. The second shredder 107, a second blunger 112, a second tank 117, a second heat exchanger 122, and a second pump 127 may operate parallel to, or substantially parallel to, the shredder 105, blunger 110, tank 115, heat exchanger 120, and pump 125. In at least one embodiment, a second slurry may be transferred from the second pump 127 to the fluidizer 130. In another embodiment (not shown), both the slurry and at least a portion of the second slurry may be transferred from the pump 125. The second slurry may be transferred to and mixed with the slurry via one or more conduits (shown as lines 128, 129). In at least one embodiment, the second slurry may be introduced directly to the fluidizer 130. For example, the second slurry may be introduced to at least a portion of the one or more atomizing nozzles 132, described below. In at least one embodiment, at least a portion of the second slurry may be transferred to a shell applicator 180 via one or more conduits (shown as line 179), as described in greater detail below.

The fluidizer 130 may include one or more atomizing nozzles 132, a particle bed 134, and a plate 136. The particle bed 134 may be supported by the plate 136, which can include a perforated, straight or directional plate. Hot air may flow through the plate 136. The particle bed 134 may include seeds, from which green pellets of a target size may be grown. The term "green pellets" and related forms, as used herein, refers to pellets which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In certain embodiments, the seed contains about 5% to about 20% of the total volume of a green pellet formed therefrom. The slurry and/or the second slurry may be sprayed, under pressure, through the atomizing nozzles 132, and the slurry and/or the second slurry may spray coat the seeds to form green pellets.

External seeds can be placed on the perforated plate 136 before atomization of the slurry by the fluidizer 130 begins. If external seeds are used, the seeds can be prepared in a slurry process, where the seeds are simply taken from the fluidizer 130, or alternative by another, separate fluidizer, at a target seed size. External seeds can also be prepared in a high intensity mixing process such as that described in U.S. Pat. No. 4,879,181, the disclosure of which is incorporated herein by reference.

Alternatively, seeds for the particle bed are formed by the atomization of the slurry and/or second slurry, thereby providing a method by which the slurry and/or second slurry "self-germinates" with its own seed. According to one such embodiment, the slurry and/or second slurry is fed through the fluidizer 130 in the absence of a seeded particle bed 134. The slurry and/or second slurry droplets exiting the nozzles 132 solidify, but are small enough initially that they get carried out of the fluidizer 130 by air flow and caught as "dust" (fine particles) by a dust collector 145, which may, for instance, be an electrostatic precipitator, a cyclone, a bag filter, a wet scrubber or a combination thereof. The dust from the dust collector is then fed to the particle bed 134 through dust inlet 162, where it is sprayed with slurry and/or second slurry exiting the nozzles 132. The dust may be recycled a sufficient number of times, until the seed particle has grown to a point where it is too large to be carried out by the air flow and can serve as seed. The dust can also be recycled to another operation in the process, for example, the tanks 115, 117. Once the seed particle has grown to a sufficient size, they may accumulate in the particle bed 134 as green pellets. The accumulated green pellets may then flow out of the fluidizer 130 via an outlet 140.

The system 100 may also include a rotary valve 150 transfers the green pellets to an elevator 155, which feeds the green pellets to a screening system 160 that separates the green pellets into one or more fractions (e.g., an oversized fraction, a product fraction, and an undersized fraction). In a continuous process, the oversize green pellets may be recycled to one or more of shredders 105, 107, blungers 110, 112, and tanks 115, 117, where at least some of the oversize green pellets can be broken down and blended with or alternatively fed into the slurry and/or second slurry. Alternatively, oversize green pellets can be broken down and recycled to the particle bed 134 in the fluidizer 130. The undersize fraction exiting the screening system 160 includes those green pellets that are smaller than the desired product size. In a continuous process, these green pellets may be recycled to the fluidizer 130, where they can be fed through as seeds or as a secondary feed to the fluidizer 130. The product fraction includes the green pellets having the desired size. The product fraction of the green pellets may be transferred to a pre-sintering device (e.g., a calciner) 165, where the green pellets are dried and/or calcined in an atmosphere containing from about 0.5-21% oxygen to provide calcined green pellets. The green pellets and/or calcined green pellets may then be sintered in a sintering device 170 in an atmosphere containing from about 0.5-21% oxygen to provide sintered pellets. In at least one embodiment, the system 100 may also include the shell applicator 180 that is configured to apply (e.g., spray) one or more layers (e.g., a combination layer and/or a shell layer) onto the sintered pellets, as described in greater detail below. Additional details describing one or more portions of the system 100 are disclosed U.S. Pat. No. 8,614,157, the disclosure of which is incorporated herein by reference.

Figure 2:
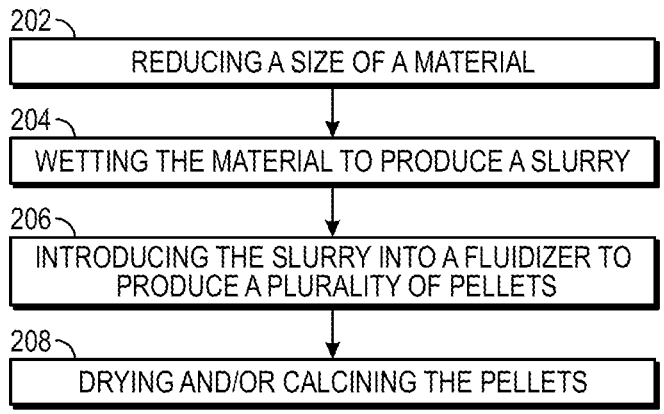
FIG. 2 illustrates a flowchart of a (e.g., wet) method for producing an electrically-conductive pellet, according to an embodiment.

FIG. 2 illustrates a flowchart of a (e.g., wet) method 200 for producing a pellet (e.g., using the system 100), according to an embodiment. The method 200 may include reducing a size of a material, as at 202. For example, size of the material may be reduced using the shredder 105 and/or the blunger 110. The material may be or include coke (e.g., petroleum coke or coke breeze), calcined coke, metal powder, graphite, or a combination thereof. In another embodiment, the material may also or instead be a blend of clay, such as kaolin and/or bauxite, petroleum coke, calcined petroleum coke, or a combination thereof. This may create a composite network of electrical conductive domains and strong ceramic domains.

The material may include any weight ratio of coke to clay suitable to provide the composite network. For example, the material may have a weight ratio of coke to clay from about 1:25, about 1:20, about 1:10, about 1:5, about 1:3 or about 1:2 to about 1:1.5, about 1:1, about 2:1, about 3:1, about 4:1, or about 5:1.

The method 200 may also include wetting the material to produce a slurry, as at 204. The material may be wetted before, simultaneously with, and/or after the size of the material is reduced. For example, the material may be wetted in the blunger 110 and/or the tank 115 until the slurry has a solids content from about 40% to about 60% (by weight). In one example, the material may be wetted by adding water. The material may also or instead be wetted by adding one or more organic binders, inorganic binders, dispersants, pH-adjusting reagents, or a combination thereof. The organic binders may be or include polyvinyl alcohol, starch, polyvinylpyrrolidone, poly(ethylene) glycol, EO-PO copolymer, and the like. The inorganic binders may be or include sodium silicates, bentonite clay, and the like. The dispersants may be or include bentonite clay, xanthan gum, surfactant (e.g., EH-9, PEG-PPG-PEG), or a combination thereof. In at least one embodiment, glass microspheres may be added to the slurry to improve the mechanical strength and dimensional stability.

The method 200 may also include introducing the slurry into a fluidizer 130 to produce a plurality of green pellets, as at 206. The slurry may flow through the nozzles 132 and solidify as green pellets that accumulate in the particle bed 134.

The method 200 may also include drying and/or calcining the green pellets in an atmosphere containing from about 0.5% to 21% oxygen, as at 208. This may include heating the green pellets in the pre-sintering device 165 and/or the sintering device 170 at a temperature from about 1200° C. to about 1450° C. or more. Additional details describing one or more portions of the method 200 are disclosed U.S. Pat. No. 8,614,157, the disclosure of which is incorporated herein by reference.

The calcined and/or sintered pellets, or pellets, may have an average cross-sectional length (e.g., diameter) from about 100 µm to about 6000 µm, from about 200 µm to about 4000 µm, or from about 300 µm to about 2000 µm. The pellets may have a bulk density from about 0.3 g/cm$^3$ to about 2.0 g/cm$^3$, about 0.5 g/cm$^3$ to about 1.6 g/cm$^3$, or about 0.7 g/cm$^3$ to about 1.2 g/cm$^3$. The pellets may have an electrical conductivity from about 100 siemens per meter (S/m) to about 3,000 S/m, or from about 500 S/m to about 2,000 S/m. The pellets may have a strength (e.g., crush resistance) from about 1% crush @6 k to about 40% crush @6 k, or from about 5% crush @6 k to about 15% crush @6 k. The mean or average pellet size can be controlled and can span the range from about 100 microns to about 3,000 microns in diameter, from about 150 microns to about 800 microns, or from about 200 microns to about 400 microns. The pellet size distribution can be controlled such that about 90% of the pellets fall within specific target ranges such as from about 100 microns to about 3,000 microns, from about 100 microns to about 200 microns, from about 200 microns to about 400 microns, from about 300 microns to about 600 microns, or from about 400 microns to 800 microns.

Figure 3:
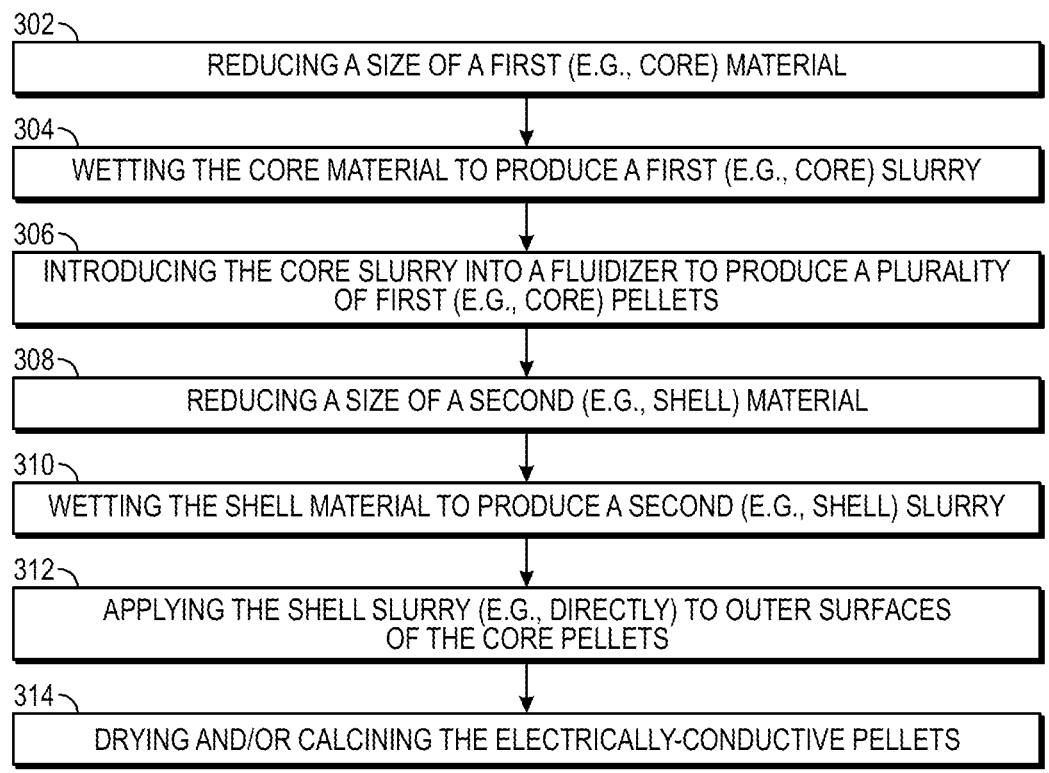
FIG. 3 illustrates a flowchart of another (e.g., wet) method for producing an electrically-conductive pellet, according to an embodiment.

FIG. 3 illustrates a flowchart of another (e.g., wet) method 300 for producing an electrically-conductive pellet (e.g., using the system 100), according to an embodiment. The method 300 may include reducing a size of a first (e.g., core) material, as at 302. For example, size of the core material may be reduced using the shredder 105 and/or the blunger 110. The core material may be or include alumina, silica, kaolin, bauxite, or a combination thereof. In another embodiment, the core material may also or instead be a blend of clay, petroleum coke, calcined petroleum coke, or a combination thereof. This may create a composite network of electrical conductive domains and strong ceramic domains.

The method 300 may also include wetting the core material to produce a first (e.g., core) slurry, as at 304. The core material may be wetted before, simultaneously with, and/or after the size of the core material is reduced. For example, the core material may be wetted in the blunger 110 and/or the tank 115 until the core slurry has a solids content from about 40% to about 60% (e.g., by weight). In one example, the core material may be wetted by adding water. The core material may also or instead be wetted by adding organic binders, inorganic binders, dispersants, pH-adjusting reagents, or a combination thereof, such as those described above. In at least one embodiment, glass microspheres may be added to the core slurry to improve the mechanical strength and dimensional stability.

The method 300 may also include introducing the core slurry into a fluidizer 130 to produce a plurality of (e.g., core) pellets, as at 306. More particularly, the core slurry may flow through the nozzles 132 and solidify as core pellets that accumulate in the particle bed 134.

The method 300 may also include reducing a size of a second (e.g., shell) material, as at 308. For example, the size of the shell material may be reduced using the shredder 105 and/or the blunger 110. In at least one embodiment, the size of the shell material may be reduced using any one or more of the shredders 105, 107, blungers 110, 112, and tanks 115, 117. The shell material may be or include an electrically-conductive material such as coke (e.g., petroleum coke or coke breeze), calcined coke, metal powder, graphite, or a combination thereof. The metal powders may be or include aluminum, copper, zinc, iron, nickel, or a combination thereof.

The method 300 may also include wetting the shell material to produce a second (e.g., shell) slurry, or the second slurry as described above, as at 310. The shell material may be wetted before, simultaneously with, and/or after the size of the shell material is reduced. For example, the shell material may be wetted in the blunger 110 and/or the tank 115 until the shell slurry has a solids content from about 40% to about 60% (e.g., by weight). In at least one embodiment, the shell slurry may be wetted in any one or more of the blungers 110, 112 and tanks 115, 117. In one example, the shell material may be wetted by adding water. The shell material may also or instead be wetted by adding organic binders, inorganic binders, dispersants, pH-adjusting reagents, or a combination thereof, such as those described above. In at least one embodiment, glass microspheres may be added to the shell slurry to improve the mechanical strength and dimensional stability.

The core portion of the method 300 (e.g., steps 302, 304, 306) may be performed before, simultaneously with, or after the shell portion of the method 300 (e.g., steps 308, 310). For example, the shell portion may be formed by the second shredder 107, second blunger 112, second tank 117, second heat exchanger 122, and second pump 127 while the core portion may be formed by the shredder 105, blunger 110, tank 115, heat exchanger 120, and pump 125. In at least one embodiment, the shell slurry may be mixed with the core slurry, for example via lines 128, 129. In another embodiment, the core slurry may be introduced to the nozzles 132 prior to introducing the shell slurry to the nozzles 132.

The method 300 may also include applying the shell slurry (e.g., directly) to outer surfaces of the core pellets, as at 312. For example, this may include spraying the shell slurry, under pressure, through one or more of the atomizing nozzles 132 to wet and ultimately coat cores, or seeds, with the shell slurry to form the green pellets in the fluidizer 130. In one or more embodiments, the core slurry may form the seed pellets described above. For example, the core, or first, slurry may be used to form seeds and the shell, or second, slurry may be used to grow the seeds into green pellets in the fluidizer 130 in the manner described above. In an alternate embodiment, this may include the shell applicator 180 spraying droplets of the shell slurry onto the outer surfaces of the core pellets, which may wet the outer surfaces of the core pellets.

FIG. 4 illustrates a schematic view of the shell slurry (e.g., droplets) 430 being sprayed onto the core pellet 410, and FIG. 5 illustrates a schematic view of the shell slurry 430 wetting the outer surface of the core pellet 410, according to an embodiment. The shell slurry 430 may then solidify on the outer surface of the core pellet 410, producing a shell layer 430 that at least partially surrounds the core pellet 410. FIG. 6 illustrates a schematic view of the shell slurry 430 solidifying on the core pellet 410, and FIG. 7 illustrates a schematic view of the solidified shell slurry (now referred to as a shell layer) 430 on the core pellet 410, thereby forming an electrically-conductive pellet 400, according to an embodiment.

The method 300 may also include drying and/or calcining the electrically-conductive pellets 400 in an atmosphere containing from about 0.5% to 21% oxygen, as at 314. This may include heating the electrically-conductive pellets 400 in the pre-sintering device 165 and/or the sintering device 170 in an atmosphere containing from about 0.5% to 21% oxygen and at a temperature from about 1200° C. to about 1450° C. In at least one embodiment, the core pellets 410 may be dried and/or calcined prior to applying the shell slurry/layer 430. In another embodiment, the core pellets 410 may be dried and/or calcined prior to applying the shell slurry/layer 430, and the shell slurry/layer 430 may also be dried and/or calcined. In yet another embodiment, the core pellets 410 may not be dried and/or calcined, and the electrically-conductive pellets 400 may be dried and/or calcined after the shell slurry/layer 430 is applied.

FIG. 8 illustrates a cross-sectional view of the electrically-conductive pellet 400 (e.g., produced using the method 300), according to an embodiment. The core material/pellet 410 may make up from about 1% to about 99%, about 20% to about 85%, or about 50% to about 80% of the volume, mass, or average cross-sectional length (e.g., diameter) of the electrically-conductive pellet 400, and the shell material/layer 430 may make up from about 1% to about 99%, about 10% to about 60%, or about 20% to about 50% of the volume, mass, or average cross-sectional length (e.g., diameter) of the electrically-conductive pellet 400.

Figure 9:
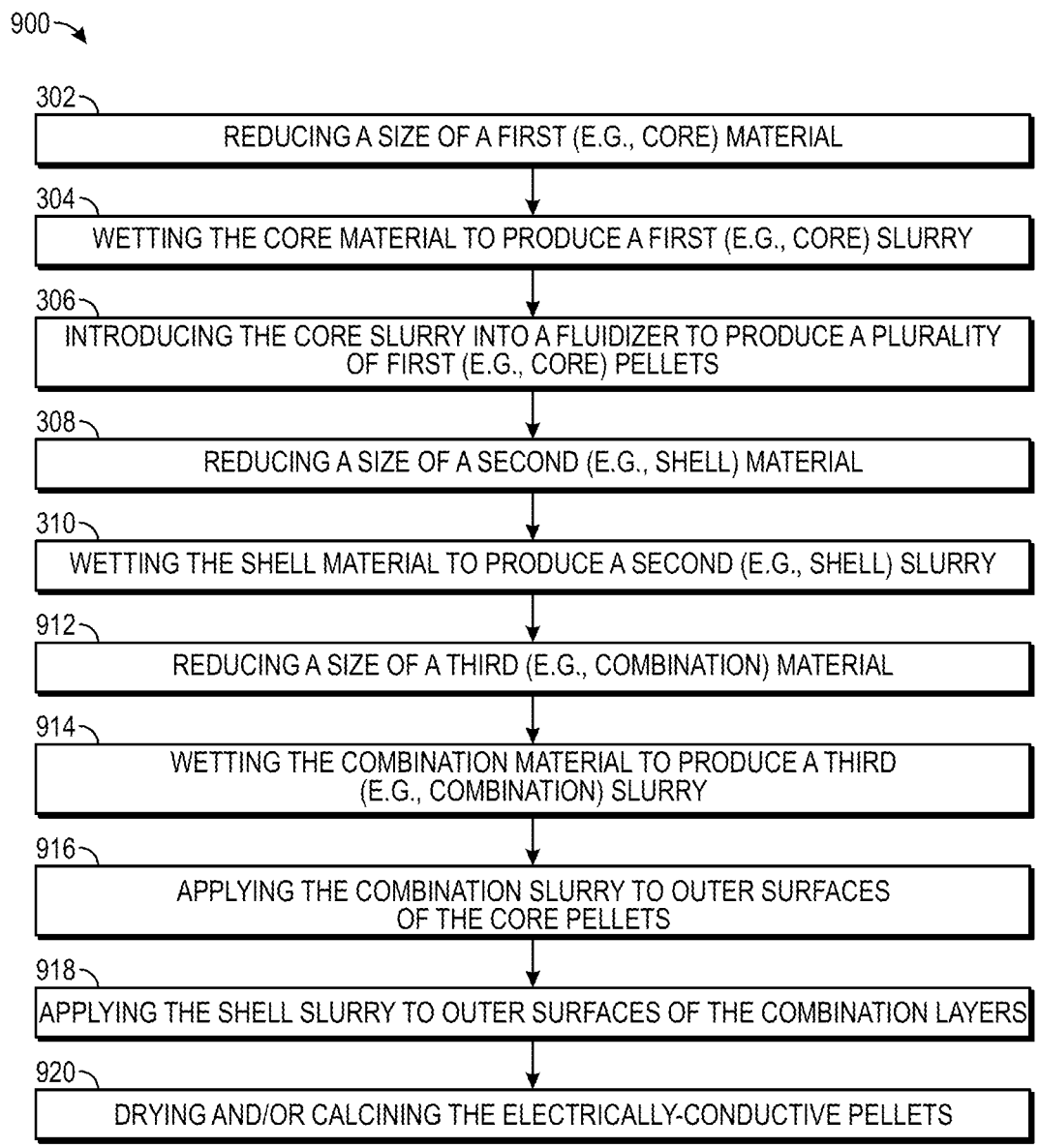
FIG. 9 illustrates a flowchart of another (e.g., wet) method for producing an electrically-conductive pellet, according to an embodiment.

FIG. 9 illustrates a flowchart of another (e.g., wet) method 900 for producing an electrically-conductive pellet, according to an embodiment. The method 900 may be similar to the method 300. For example, the method 900 may begin with steps 302, 304, 306, 308, and/or 310.

The method 900 may also include reducing a size of a third (e.g., combination) material, as at 912. For example, size of the combination material may be reduced using the shredder 105 and/or the blunger 110. The combination material may be or include a combination (e.g., a mixture) of the core material and the shell material. For example, if the core material is alumina, and the shell material is coke, the combination material may be a combination (e.g., mixture) of alumina and coke. The combination material may include from about 20% to about 80%, from about 30% to about 70%, or from about 40% to about 60% of the core material, and from about 20% to about 80%, from about 30% to about 70%, or from about 40% to about 60% of the shell material.

The method 900 may also include wetting the combination material to produce a third (e.g., combination) slurry, as at 914. The combination material may be wetted before, simultaneously with, and/or after the size of the combination material is reduced. For example, the combination material may be wetted in the blunger 110 and/or the tank 115 until the combination slurry has a solids content from about 40% to about 60% (e.g., by weight). In one example, the combination material may be wetted by adding water. The combination material may also or instead be wetted by adding organic binders, inorganic binders, dispersants, pH-adjusting reagents, or a combination thereof, such as those described above. In at least one embodiment, glass microspheres may be added to the combination slurry to improve the mechanical strength and dimensional stability. The combination portion of the method 900 (e.g., steps 912, 914) may be performed before, simultaneously with, or after the core portion of the method 900 (e.g., steps 302, 304, 306) and/or the shell portion of the method 900 (e.g., steps 308, 310).

The method 900 may also include applying the combination slurry to outer surfaces of the core pellets, as at 916. For example, this may include the shell applicator 180 spraying droplets of the combination slurry onto the outer surfaces of the core pellets, which may wet the outer surfaces of the core pellets, similar to that which is shown in FIGS. 4 and 5. The droplets may then solidify on the outer surfaces of the core pellets, producing a combination layer that at least partially surrounds each core pellet, similar to that which is shown in FIGS. 6 and 7.

The method 900 may also include applying the shell slurry to outer surfaces of the combination layers, as at 918. For example, this may include the fluidizer 130 and/or the shell applicator 180 spraying droplets of the shell slurry onto the outer surfaces of the combination layers, which may wet the outer surfaces of the combination layers, similar to that which is shown in FIGS. 4 and 5. The droplets may then solidify on the outer surfaces of the combination layers, producing a shell layer that at least partially surrounds each combination layer, similar to that which is shown in FIGS. 6 and 7. The combination of the core pellet, the combination layer, and the shell layer may produce an electrically-conductive pellet.

The method 900 may also include drying and/or calcining the electrically-conductive pellets, as at 920. This may include heating the electrically-conductive pellets in the pre-sintering device 165 and/or the sintering device 170 at a temperature from about 1200° C. to about 1450° C. In at least one embodiment, the core pellets may be dried and/or calcined prior to applying the combination slurry/layer and prior to applying the shell slurry/layer. In another embodiment, the core pellets may be dried and/or calcined, the combination slurry/layer may be dried and/or calcined, and the shell slurry/layer may be dried and/or calcined. In an embodiment, the core pellets may be dried and/or calcined before the combination slurry/layer is dried and/or calcined and the shell slurry/layer may be dried and/or calcined after the combination slurry/layer is dried and/or calcined on the core pellet.

Figure 10:
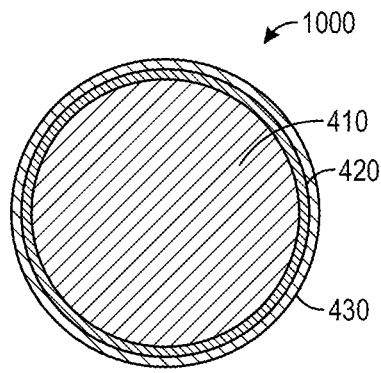
FIG. 10 shows a cross-sectional view of an illustrative electrically-conductive pellet (e.g., produced using the method in FIG. 9), according to an embodiment.

FIG. 10 shows a cross-sectional view of an illustrative electrically-conductive pellet 1000 (e.g., produced using the method 900), according to an embodiment. As shown, the electrically-conductive pellet 1000 may include the core material/pellet 410, the combination material/layer 420, and the shell material/layer 430. The core material/pellet 410 may make up from about 30% to about 80% or about 40% to about 70% of the volume, mass, or average cross-sectional length (e.g., diameter) of the electrically-conductive pellet 1000. The combination material/layer 420 may make up from about 10% to about 40% or about 15% to about 30% of the volume, mass, or average cross-sectional length (e.g., diameter) of the electrically-conductive pellet 1000. The shell material/layer 430 may make up from about 10% to about 60% or about 20% to about 50% of the volume, mass, or average cross-sectional length (e.g., diameter) of the electrically-conductive pellet 1000.

Including the combination material/layer in the electrically-conductive pellet may compatibilize differences in the coefficient of thermal expansions (CTEs) of the core and shell compositions. As the calcined and/or sintered pellet cools, the coefficient of thermal expansion is a measure of the rate at which the material shrinks. A core-shell pellet with differing coefficients of thermal expansion will shrink at different rates and could result in delamination of the shell from the core.

The electrically-conductive pellets 400, 1000 may have an average cross-sectional length (e.g., diameter) from about 100 μm to about 6000 μm, from about 200 μm to about 4000 μm, or from about 300 μm to about 2000 μm. The electrically-conductive pellets 400, 1000 may have a bulk density from about 0.3 g/cm$^3$ to about 2.0 g/cm$^3$, about 0.5 g/cm$^3$ to about 1.6 g/cm$^3$, or about 0.7 g/cm$^3$ to about 1.2 g/cm$^3$. The shell material/layer 430 and/or the electrically-conductive pellets 400, 1000 may have an electrical conductivity from about 100 S/m to about 3000 S/m or about 200 S/m to about 2000 S/m. The electrically-conductive pellets 400, 1000 may have a strength (e.g., crush resistance) from about 0.5% crush @6 k to about 10% crush @6 k or about 1% crush @6 k to about 8% crush @6 k.

The shape and surface uniformity/smoothness of the electrically conductive pellets 400, 1000 is improved relative to the commercially-available carbon-based material. Pellets of uniform shape pack more efficiently into confined space, which maximizes the number of pellet-pellet contact points and increases electrical conductivity. Creation of a smooth surface maximizes the contact area where two pellets touch and increases electrical conductivity. In one or more embodiments, the electrically conductive pellets 400, 1000 may have a spherical shape or in the shape of an oblate or prolate spheroid. In an embodiment, the electrically conductive pellets 400, 1000 have a substantially round and spherical shape.

In at least one embodiment, a non-radioactive tracer (NRT) may be added into the composition of the pellets 400, 1000. For example, the NRT may be added into the core material/pellet 410, the combination material/layer 420, and/or the shell material/layer 430. Additional details about the NRT may be found in U.S. patent application Ser. No. 13/038,098, the disclosure of which is incorporated herein by reference.

Figure 11:
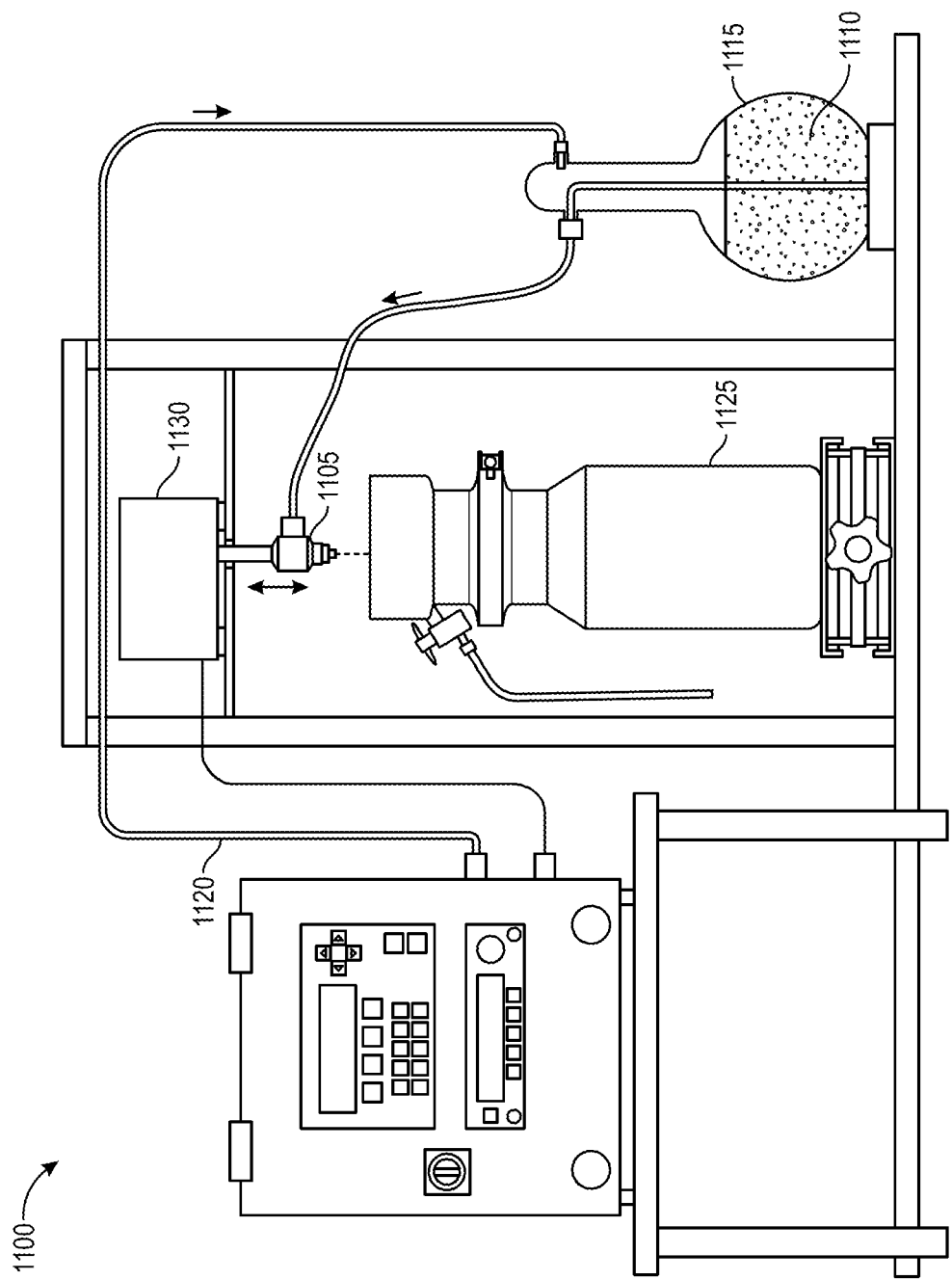
FIG. 11 illustrates a schematic view of a system for producing an electrically-conductive pellet, according to an embodiment.

FIG. 11 illustrates another system 1100 for producing an electrically-conductive pellet, according to an embodiment. The system 1100 includes a nozzle 1105 that receives a slurry 1110 from a feed tank 1115, which contains the raw materials suspended in water. Pressure applied to the feed tank 1115 by a pressure supply system 1120 causes the slurry 1110 to flow through the nozzle 1105 at a selected rate (e.g., in laminar flow). Below the nozzle 1105 is coagulation vessel 1125, which receives the droplets that pass through the nozzle 1105. A vibrator unit 1130 is connected to the nozzle 1105 and is used to supply pressure pulses to the nozzle 1105 or directly in the slurry 1110 flowing to the nozzle 1105. The resulting vibration of the slurry 1110 flowing through the nozzle 1105 causes the stream exiting the nozzle 1105 to break into droplets of substantially uniform size. As the droplets fall toward the coagulation vessel 1125, surface tension effects tend to form the droplets into spheres.

Figure 12:
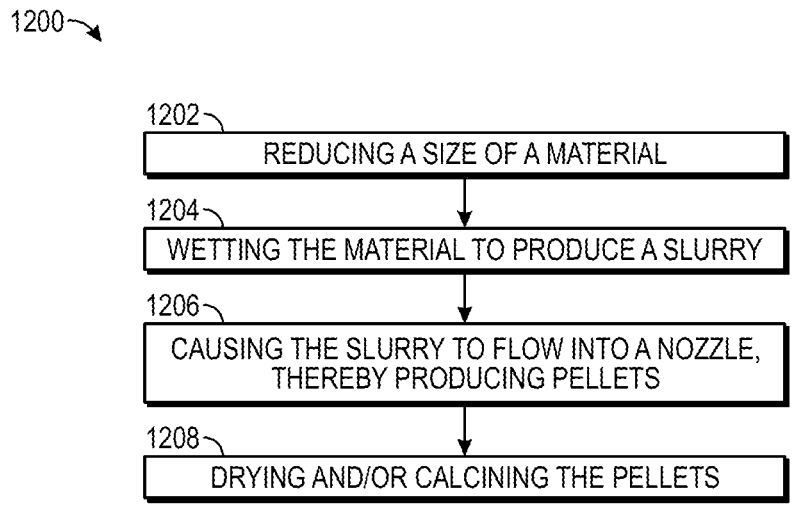
FIG. 12 illustrates a flowchart of another (e.g., drip cast) method for producing an electrically-conductive pellet, according to an embodiment.

FIG. 12 illustrates a flowchart of another (e.g., drip cast) method 1200 for producing an electrically-conductive pellet (e.g., using the system(s) 100 and/or 1100), according to an embodiment. The method 1200 may include reducing a size of a material, as at 1202. For example, size of the material may be reduced using the shredder 105 and/or the blunger 110. While conventional drip casting methods may use kaolin as the material, the method 1200 described herein replaces the kaolin with coke (e.g., petroleum coke or coke breeze), metal powder, graphite, or a combination thereof. In another embodiment, the material may also or instead be a blend of clay (e.g., kaolin, bauxite, alumina) and coke shell (e.g., green and/or calcined).

The method 1200 may also include wetting the material to produce a slurry, as at 1204. The material may be wetted before, simultaneously with, and/or after the size of the material is reduced. For example, the material may be wetted in the blunger 110 and/or the tank 115 until the slurry has a solids content from about 40% to about 60% (e.g., by weight). In one example, the material may be wetted by adding water. The core material may also or instead be wetted by adding alginic acid (e.g., sodium alginate), an organic binder, an inorganic binder, a dispersant, a pH-adjusting reagent, or a combination thereof, such as those described above. In at least one embodiment, glass microspheres may be added to the slurry to improve the mechanical strength and dimensional stability.

The method 1200 may also include introducing the slurry into a system 1100 (e.g., a nozzle 1105) to produce a plurality of pellets, as at 1206. More particularly, this may include causing the slurry to flow through the nozzle 1105, thereby forming droplets of the slurry that fall into the coagulation vessel 1125. In at least one embodiment, the coagulation vessel 1125 may include a calcium chloride solution at concentration levels of about 0.5% to about 10% by weight. When the droplets of slurry fall into the solution in the coagulation vessel 1125, the droplets may be solidified into pellets.

The method 1200 may also include drying and/or calcining the pellets, as at 1208. This may include heating the pellets in the pre-sintering device 165 and/or the sintering device 170 at a temperature from about 1200° C. to about 1450° C. or more. Additional details describing one or more portions of the system 1100 and/or the method 1200 are disclosed U.S. Pat. Nos. 8,865,631, 8,883,693, 9,145,210, 9,670,400, 10,077,398, 10,077,395, and 10,118,863, the disclosures of which are incorporated herein by reference.

The electrically-conductive pellets produced using the method 1200 may have an average cross-sectional length (e.g., diameter) from about 100 μm to about 6000 μm, from about 200 μm to about 4000 μm, or from about 300 μm to about 2000 μm. The electrically-conductive pellets may have a bulk density from about 0.3 g/cm$^3$ to about 2.0 g/cm$^3$, about 0.5 g/cm$^3$ to about 1.6 g/cm$^3$, or about 0.7 g/cm$^3$ to about 1.2 g/cm$^3$. The electrically-conductive pellets may have an electrical conductivity from about 100 S/m to about 4000 S/m or about 200 S/m to about 3000 S/m. The electrically-conductive pellets may have a strength (e.g., crush resistance) from about 0.5% crush @6 k to about 10% crush @6 k or about 1% crush @6 k to about 8% crush @6 k. The electrically-conductive pellets described herein may be used as proppant, electrode backfill material, coating additives, adhesive additives, sealant additives, composite EMI shielding, and the like. As described above, the NRT material may also be added into the composition of the pellets produced using the method 1200.

Figure 13:
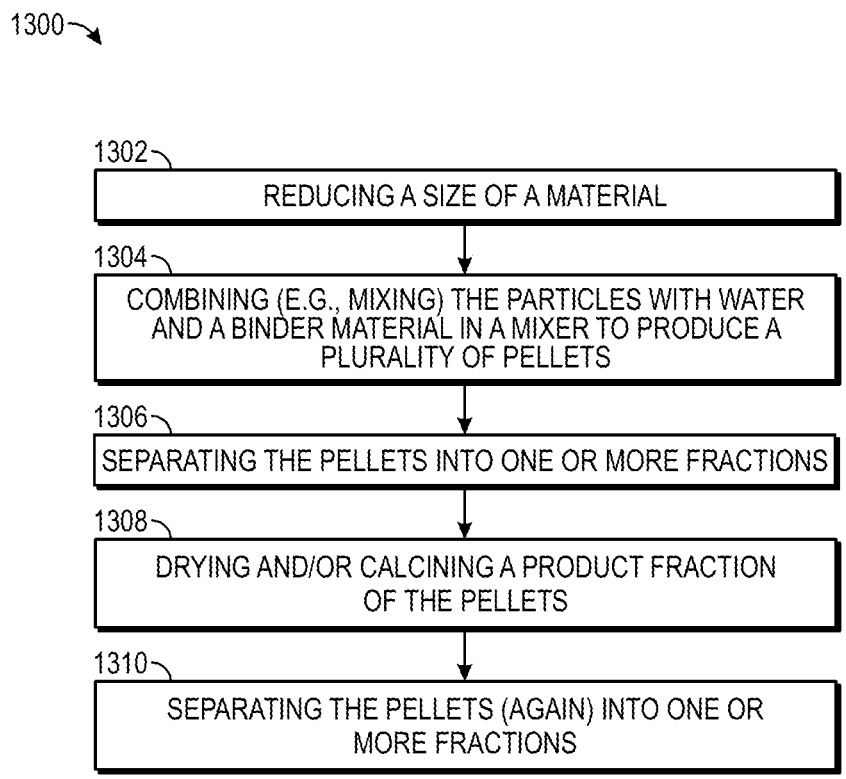
FIG. 13 illustrates a flowchart of another (e.g., dry) method for producing an electrically-conductive pellet, according to an embodiment.

FIG. 13 illustrates a flowchart of another (e.g., dry) method 1300 for producing an electrically-conductive pellet (e.g., using the system(s) 100 and/or 1100), according to an embodiment. The method 1300 may include reducing a size of a material, as at 1302. In at least one embodiment, this may include dry milling the material to create a uniform blend of particles of a desired size. The material may be or include any of the materials described above. For example, the material may be or include calcined coke as the mineral ore. The material may also or instead include a blend of clay (e.g., kaolin, bauxite, alumina) and coke (e.g., green and/or calcined). In another embodiment, the core-shell approach may be used with a kaolin core and a coke shell (e.g., green and/or calcined). This may be produced with or without the combination layer.

The method 1300 may also include combining (e.g., mixing) the particles with water and a binder material in a mixer (e.g., an Eirich mixer) to produce a plurality of (green) pellets, as at 1304. The water may be added at a level of about 15-30%. The binder material may be or include any of the binder materials described above. The method 1300 may also include separating the pellets into one or more fractions, as at 1306. For example, the pellets may be separated into an oversized fraction, a product fraction, and an undersized fraction using the screening system 160 described above. The method 1300 may also include drying and/or calcining the (product fraction of the) pellets in an atmosphere containing from about 0.5% to 21% oxygen, as at 1308. The pellets may be dried and/or calcined using the pre-sintering device 165, the sintering device 170, and/or a kiln. In one particular example, the pellets may be dried and/or calcined first by the pre-sintering device 165 and/or the sintering device 170, and then subsequently by a kiln.

The method 1300 may also include separating the pellets (again) into one or more fractions, as at 1310. For example, after the pellets are dried and/or calcined, the pellets may be separated into an oversized fraction, a product fraction, and an undersized fraction using the screening system 160 described above. Additional details about the method 1300 may be found in U.S. patent application Ser. Nos. 13/038,098 and 12/253,681; and in U.S. Pat. No. 4,623,630, the disclosures of which are incorporated herein by reference.

Exemplary embodiments of the present disclosure further relate to any one or more of the following paragraphs:

1. A method for producing an electrically-conductive pellet, characterized by: reducing a size of a first material; wetting the first material to produce a first slurry; introducing the first slurry into a fluidizer to produce a first pellet; reducing a size of a second material, wherein the second material contains an electrically-conductive material; wetting the second material to produce a second slurry; and applying the second slurry to the first pellet.

2. The method according to paragraph 1, wherein the first material contains alumina, silica, kaolin, bauxite, or a combination thereof.

3. The method according to paragraphs 1 or 2, wherein the second material contains coke, metal, graphite, or a combination thereof.

4. The method according to any one of paragraphs 1 to 3, wherein the first material, the second material, or both contains a blend of clay, petroleum coke, calcined petroleum coke, or a combination thereof.

5. The method according to any one of paragraphs 1 to 4, wherein an average cross-sectional length of the electrically-conductive pellet is from about 200 µm to about 4000 µm.

6. The method according to any one of paragraphs 1 to 5, wherein a bulk density of the electrically-conductive pellet is from about 0.3 g/cm3 to about 2.0 g/cm3.

7. The method according to any one of paragraphs 1 to 6, wherein an electrical conductivity of the electrically-conductive pellet is from about 100 S/m to about 3000 S/m.

8. The according to any one of paragraphs 1 to 7, further characterized by calcining the electrically-conductive pellet.

9. The according to any one of paragraphs 1 to 8, further characterized by: reducing a size of a third material, wherein the third material contains a combination of the first material and the second material; and wetting the third material to provide a third slurry.

10. The method according to paragraph 9, further characterized by applying the third material to the first pellet before the second slurry is applied such that the third material is positioned at least partially between the first pellet and the second material.

11. The method according to paragraph 1, further characterized by: reducing a size of a third material, wherein the third material contains a combination of the first material and the second material; wetting the third material to produce a third slurry; applying the third material to the first pellet before the second slurry is applied such that the third material is positioned at least partially between the first pellet and the second material; and calcining the electrically-conductive pellet after the second and third materials have been applied to the first pellet, and wherein: the first material contains alumina, silica, kaolin, bauxite, or a combination thereof, the second material contains coke, metal, graphite, or a combination thereof, an average cross-sectional length of the electrically-conductive pellet is from about 300 µm to about 2000 µm, a bulk density of the electrically-conductive pellet is from about 0.5 g/cm3 to about 1.6 g/cm3, and an electrical conductivity of the electrically-conductive pellet is from about 500 S/m to about 2000 S/m.

12. An electrically-conductive pellet, characterized by: a core made from a first material containing alumina, silica, kaolin, bauxite, or a combination thereof; and a shell layer that at least partially surrounds the core, wherein the shell layer is made from a second material that is electrically-conductive, wherein the electrically-conductive pellet has: an average cross-sectional length from about 200 µm to about 4000 µm, a bulk density from about 0.3 g/cm3 to about 2.0 g/cm3, and an electrical conductivity from about 100 S/m to about 3000 S/m.

13. The electrically-conductive pellet according to paragraph 12, wherein the shell layer contains petroleum coke, metal, graphite, or a combination thereof.

14. The electrically-conductive pellet according to paragraph 13, further characterized by an intermediate layer positioned at least partially between the core and the shell layer.

15. The electrically-conductive pellet according to paragraph 14, wherein the intermediate layer contains a combination of the first material and the second material.

16. The electrically-conductive pellet according to paragraph 15, wherein: the core makes up from about 30% to about 80% of the electrically-conductive pellet, the intermediate layer makes up from about 10% to about 40% of the electrically-conductive pellet, and the shell layer makes up from about 10% to about 60% of the electrically-conductive pellet.

17. The electrically-conductive according to any one of paragraphs 12 to 16, further characterized by a non-radioactive tracer in the core, the shell layer, or both.

18. A method for producing a pellet, characterized by: reducing a size of a material; wetting the material with water and alginate to produce a slurry; and causing the slurry to flow through a nozzle, thereby producing a droplet of the slurry that falls into a vessel containing a solution, wherein the droplet of the slurry solidifies into a pellet in response to contact with the solution.

19. The method according to paragraph 18, wherein the material contains coke, metal, graphite, or a combination thereof.

20. The method according to paragraphs 18 or 19, wherein the material contains a blend of clay and coke.

21. The method according to any one of paragraphs 18 to 20, wherein the solution contains calcium chloride.

22. The method according to any one of paragraphs 18 to 21, wherein an average cross-sectional length of the pellet is from about 200 µm to about 4000 µm.

23. The method according to any one of paragraphs 18 to 22, wherein a bulk density of the pellet is from about 0.3 g/cm3 to about 2.0 g/cm3.

24. The method according to any one of paragraphs 18 to 23, wherein an electrical conductivity of the pellet is from about 500 S/m to about 2000 S/m.

25. A method for producing a pellet, characterized by: reducing a size of a material; mixing the material with water and a binder material in a mixer to produce a plurality of pellets; separating the pellets into a first portion and a second portion; and drying and/or calcining the first portion of the pellets.

26. The method according to paragraph 25, further characterized by separating the first portion of the pellets into two or more portions after the first portion of the pellets is dried and/or calcined.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrically-conductive pellet, comprising:
a core made from a first material comprising alumina, silica, kaolin, bauxite, or a combination thereof;
a shell layer that at least partially surrounds the core, wherein the shell layer is made from a second material that is electrically-conductive; and
an intermediate layer comprising a combination of the first material and the second material;
wherein the electrically-conductive pellet has:
an average cross-sectional length from about 200 µm to about 4000 µm,
a bulk density from about 0.3 g/cm$^3$ to about 2.0 g/cm$^3$, and
an electrical conductivity from about 100 S/m to about 3000 S/m.

2. The electrically-conductive pellet of claim 1, wherein the shell layer comprises petroleum coke, metal, graphite, or a combination thereof.

3. The electrically-conductive pellet of claim 1, wherein the intermediate layer is positioned at least partially between the core and the shell layer.

4. The electrically-conductive pellet of claim 1, wherein:
the core makes up from about 30% to about 80% of the electrically-conductive pellet,
the intermediate layer makes up from about 10% to about 40% of the electrically-conductive pellet, and
the shell layer makes up from about 10% to about 60% of the electrically-conductive pellet.

5. The electrically-conductive pellet of claim 4, further comprising a non-radioactive tracer in the core, the shell layer or both.

6. The electrically-conductive pellet of claim 1, wherein the pellet has an electrical conductivity of about 100 S/m to about 4000 S/m.

7. A sintered, electrically-conductive pellet, comprising:
a core made from a first material comprising alumina, silica, kaolin, bauxite, or a combination thereof;
a shell layer that at least partially surrounds the core, wherein the shell layer is made from a second material that is electrically-conductive; and
an intermediate layer comprising a combination of the first material and the second material,
wherein the sintered, electrically-conductive pellet has:
an average cross-sectional length from about 200 µm to about 4000 µm,
a bulk density from about 0.3 g/cm$^3$ to about 2.0 g/cm$^3$, and
an electrical conductivity from about 100 S/m to about 3000 S/m;
wherein the core and shell layer are sintered to provide the sintered, electrically-conductive pellet.

8. The sintered, electrically-conductive pellet of claim 7, wherein the shell layer comprises petroleum coke, metal, graphite or a combination thereof.

9. The sintered, electrically-conductive pellet of claim 8, wherein the intermediate layer is positioned at least partially between the core and the shell layer.

10. The sintered, electrically-conductive pellet of claim 7, wherein: the core makes up from about 30% to about 80% of the sintered, electrically-conductive pellet,
the intermediate layer makes up from about 10% to about 40% of the sintered, electrically-conductive pellet,
and the shell layer makes up from about 10% to about 60% of the sintered, electrically-conductive pellet.

11. The sintered, electrically-conductive pellet of claim 10, further comprising a non-radioactive tracer in the core, the shell layer, or both.

12. The sintered, electrically-conductive pellet of claim 10, further comprising an electrical conductivity of from about 100 S/m to about 4000 S/m.

13. The sintered, electrically-conductive pellet of claim 10, further comprising an electrical conductivity of from about 500 S/m to about 2000 S/m.

* * * * *